United States Patent [19]

Cantrell et al.

[11] Patent Number: 5,420,985

[45] Date of Patent: May 30, 1995

[54] BUS ARBITER SYSTEM AND METHOD UTILIZING HARDWARE AND SOFTWARE WHICH IS CAPABLE OF OPERATION IN DISTRIBUTED MODE OR CENTRAL MODE

[75] Inventors: Jay Cantrell, Dallas; Ed Schurig, Plano, both of Tex.

[73] Assignee: Texas Instruments Inc., Dallas, Tex.

[21] Appl. No.: 921,189

[22] Filed: Jul. 28, 1992

[51] Int. Cl.⁶ .............................................. G06F 13/36
[52] U.S. Cl. .................................. 395/325; 370/85.2; 364/242.6; 364/242.92; 364/240; 364/240.2; 364/DIG. 1; 364/232.9
[58] Field of Search ....................... 395/325, 725, 425; 340/825.5; 370/85.2, 85.6

[56] References Cited

U.S. PATENT DOCUMENTS

| | | | |
|---|---|---|---|
| 4,402,040 | 8/1983 | Evett | 364/200 |
| 4,766,536 | 8/1988 | Wilson, Jr. et al. | 364/200 |
| 4,779,089 | 10/1988 | Theus | 340/825.5 |
| 4,787,033 | 11/1988 | Bomba et al. | 364/200 |
| 4,837,682 | 6/1989 | Culler | 364/200 |
| 4,980,854 | 12/1990 | Donaldson et al. | 364/900 |
| 5,129,090 | 7/1992 | Bland et al. | 395/725 |
| 5,168,568 | 12/1992 | Thayer et al. | 395/725 |
| 5,253,348 | 10/1993 | Scalise | 395/325 |
| 5,261,109 | 11/1993 | Cadambi et al. | 395/725 |

Primary Examiner—Gopal C. Ray
Attorney, Agent, or Firm—Rose Alyssa Keagy; Richard L. Donaldson

[57] ABSTRACT

A system module 20 includes a processor 10, a system bus 15, a local bus 11 coupled to the processor, arbitration circuitry 12 coupled to the local bus and the system bus for providing common hardware protocol for distributed mode and central mode operations, and protocol control circuitry 13 coupled to the arbitration circuitry, the system bus, and the local bus for providing a system bus request to the arbitration circuitry when the system module desires to perform a bus transaction. The local bus 11 may be a processor bus on a system module while the system bus 15 may be an architecture bus standard such as Futurebus+. Also a method of operating arbiter circuitry in distributed mode or central mode where no change in hardware or software is needed when switching system operations between distributed and central modes.

30 Claims, 6 Drawing Sheets

BUS ARBITER SYSTEM AND METHOD UTILIZING HARDWARE AND SOFTWARE WHICH IS CAPABLE OF OPERATION IN DISTRIBUTED MODE OR CENTRAL MODE

FIELD OF THE INVENTION

This invention relates generally to computers and specifically relates to bus system arbiter circuitry and methods.

BACKGROUND

Futurebus+ is an IEEE specification for high-performance backplane-based computing that permits architectural consistency across a broad range of computer products. Key attributes of Futurebus+ are discussed in the article of J. Theus in *Microprocessor Report*, Volume 6, Number 7, May 27, 1992. Futurebus+ is a comprehensive architectural specification designed as an open standard; that is, an interface standard for which there are no preconceived restrictions in terms of architecture, microprocessor, and software implementations. It is also a standard explicitly designed to support multiple generations of computer technology, leading to system speeds significantly greater than current systems.

Futurebus+ provides a 64-bit architecture with a compatible 32-bit subset and data path extensions to 128 or 256 bits. The protocols, while providing headroom for system growth, explicitly support real-time scheduling, fault tolerance, and high-availability and high-reliability systems.

The logical layering of the Futurebus+ specifications offers a wealth of architectural features with which designers may implement a wide variety of systems. Both loosely coupled and tightly coupled compute paradigms are supported via the parallel protocols and in the message-passing and cache-coherence protocols. The control and status registers provide a standard software interface to the Futurebus+, easing the development and transportability of I/O drivers and other system software.

Unlike older standard buses, Futurebus+ is optimized for a backplane environment. Backplane transceiver logic (BTL) circuits provide incident-wave switching capability (thus no set up and hold times), low capacitance with high current drive capability, and controlled one-volt voltage swings for better noise margins.

Bus arbitration is the process of unambiguously issuing a single bus grant. Futurebus+ specifies doing bus arbitration through the use of either a central system or a distributed system.

The central system requires each module's arbitration circuitry to send a non-bused request and grant signal to the central arbiter.

The distributed system relies on bused signals to implement a distributed, asynchronous state machine and therefore does not use central facilities. The redundancy of distributed arbitration elements allows greater fault-tolerant operation. The distributed system is logically complex and significantly slower than the central system. The distributed system uses a byte-wide data path to choose a winner during the competition phase. This data path can also be used as a message facility that is completely independent of the main bus so it is useful for fault recovery and for signaling events.

Current arbitration systems require separate software and protocol hardware for central and distributed arbitration modes. Such systems impose significant software and hardware overheads for fault tolerant systems.

It is a technical advantage of this invention to provide common run time software and common hardware protocol for distributed mode and central mode operations.

Other advantages of the invention will become apparent to those of ordinary skill in the art having reference to the following specification together with the drawings herein.

SUMMARY

An arbitration circuit providing common hardware protocol for distributed mode and central mode operations. The arbitration circuit is coupled between a local bus, a system bus, and a protocol control circuit which provides a system bus request to the arbitration circuit when a system module desires to perform a bus transaction.

Preferably, the arbitration circuit further comprises common run time software for distributed mode and central mode operations. Transceivers are coupled to the arbitration circuit and the protocol control circuit for changing output signals from the arbitration circuitry to Backplane Transistor Logic (BTL) format used by the system bus and for allowing said output signals to be input onto the system bus. The arbitration circuit comprises an arbitration protocol sequencer coupled to the protocol control circuitry, register circuitry coupled to the arbitration protocol sequencer and the local bus, and a register for indicating whether the system is operating in central or distributed modes, making dynamic mode changes possible.

It is also preferable that the register circuit comprise a register for indicating whether or not the system module is master enabled, a register for storing an arbitration message, a plurality of registers for dynamically storing a plurality of priority levels, and registers storing the configuration, control, status, and test information needed for system bus arbitration. The system bus is preferably a Futurebus+.

This is also a method of switching arbiter circuitry from servicing a system module in central mode to distributed mode, comprising the steps of receiving a signal signifying that the system is in distributed mode, and imitating the signal protocol required by a system bus when communicating with a protocol control circuit.

Additionally, this is a method of operating arbiter circuitry in distributed mode comprising the steps of receiving service requests from a protocol control circuit, and performing distributed arbitration cycles to gain mastership of a system bus for a system module. Preferably, the method also includes the steps of sending arbitrated messages, receiving arbitrated messages, and storing arbitration messages in a register for access by a processor. No change in the hardware or software of the processor is needed when the system module switches operation between distributed mode and central mode.

Furthermore, this is a method of switching arbiter circuitry from servicing a system module in distributed mode to central mode, comprising the steps of receiving a signal signifying that the system is in central mode, and communicating with a protocol control circuit using the signal protocol required by a system bus.

Moreover, this is a method of operating arbiter circuitry in central mode comprising the steps of sending priority messages, enabling the appropriate transceivers to allow the central resource to grant and pre-empt the local module, wherein no hardware modification is needed when the system module switches operation between distributed mode and central mode. Preferably, no change in software of said processor is needed when the system module switches operation between distributed mode and central mode. Also the method preferably comprises the steps of sending arbitrated messages, receiving arbitrated messages, and storing received messages in a register for access by a processor.

This is also a method of performing a priority update in an arbiter circuit comprising the steps of writing to the priority register, determining whether system is in distributed or central mode, issuing an interrupt message if in distributed mode signifying that the priority is updated, determining which priority is to be updated if in central mode, sending the priority update message appropriate for the determined priority if in central mode, monitoring whether the message has been sent over system bus, and issuing the interrupt. Preferably no change in the hardware or software of the processor is needed when the system module switches operation between distributed mode and central mode.

Additionally, this is a method of sending a general arbitration message by an arbiter circuit comprising the steps of writing to a message register, determining whether system is in central mode or distributed mode, sending the message appropriate for central mode or distributed mode, issuing an interrupt message indicating said message has been sent, wherein no change in software of said processor is needed when the system module switches operation between distributed mode and central mode. Preferably, no hardware modification is needed when the system module switches operation between distributed mode and central mode.

DETAILED DESCRIPTION OF THE PREFERRED EMBODIMENT

Figure 1:
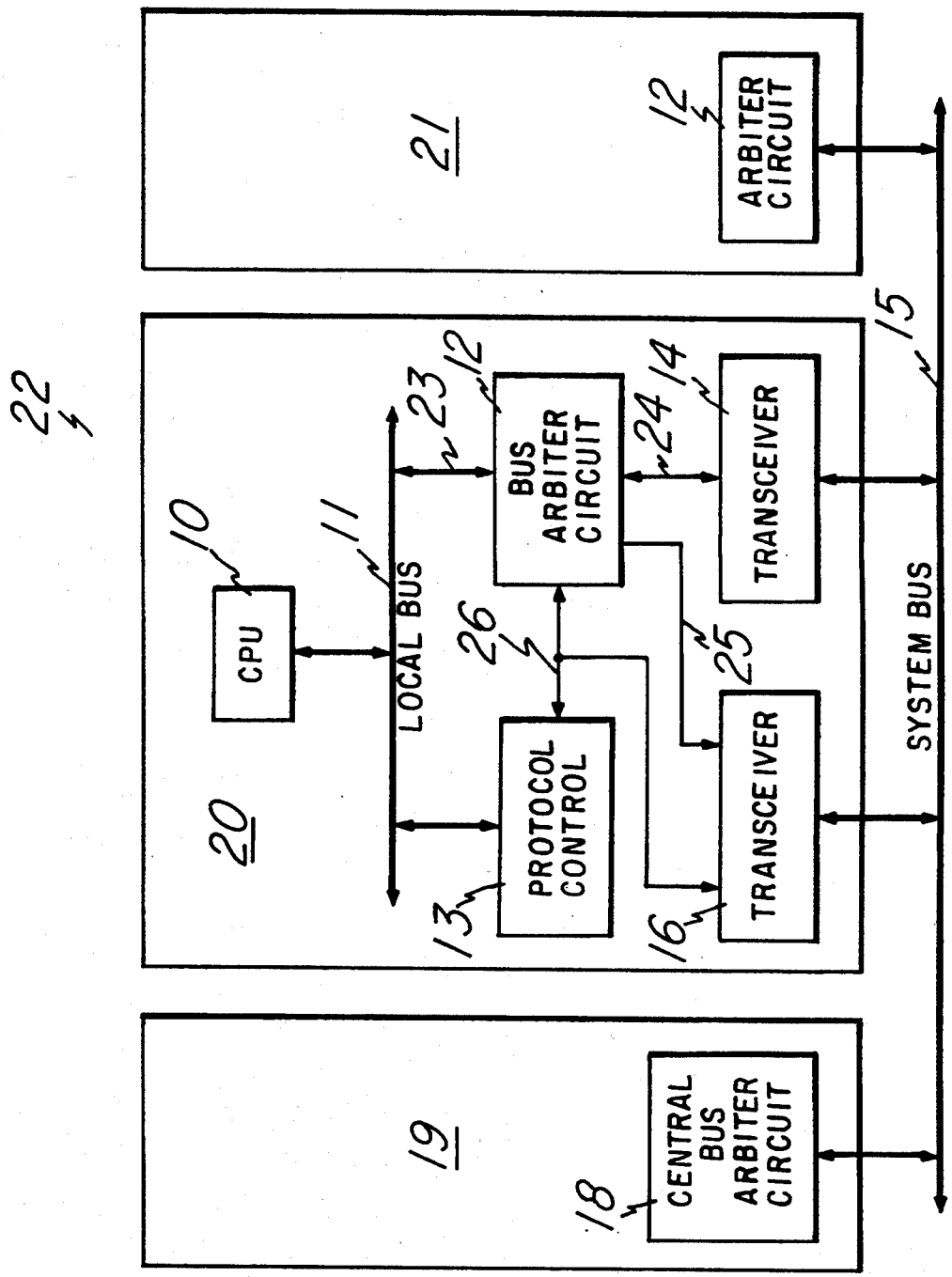
FIG. 1 is a block diagram of a system incorporating the invention.

FIG. 1 is a block level diagram illustrating a computer system 22 within which the preferred embodiment of the invention operates. The computer system 22 includes a plurality of system modules 19, 20, 21 . . . n connected to a System Bus 15. System module 20 may contain a CPU 10 coupled to Local Bus 11. Also a Protocol Controller 13 and a Bus Arbiter Circuit 12 are coupled to the Local Bus 11 and to each other. Protocol Controller 13 and Bus Arbiter Circuit 12 are also coupled to Transceivers 16 and 14. Transceivers 16 and 14 are coupled to System Bus 15.

The System Bus, 15, is preferably a Futurebus+. The system modules 19 . . . n may have a plurality of memory chips, CPUs, and/or peripheral (I/O) chips on them. The plurality of memory chips, CPUs, and I/O chips are able to communicate with one another via the System Bus 15. System module 20 may be a high-end computer board, performing a function such as, for example, regulating a flow system for the Space Shuttle.

CPU 10, for example, may comprise a Intel 486, or a Motorola 68040. While Local Bus 11, may comprise the buses that service a variety or microprocessors such as R4000, 680X0, 88XXX and 80X86. Transceivers 16 and 14 may comprise a SN74FB2031, SN74FB2032, or SN74FB2040, all manufactured by Texas Instruments. Protocol Control 13 and Bus Arbiter Circuit 12 may comprise common electrical components which together perform the function of autonomous control and arbitration for system bus and host module reads and writes known to those skilled in the art. This interface circuitry has been significantly improved by the addition of an improved Bus Arbiter Circuit 12.

Figure 2:
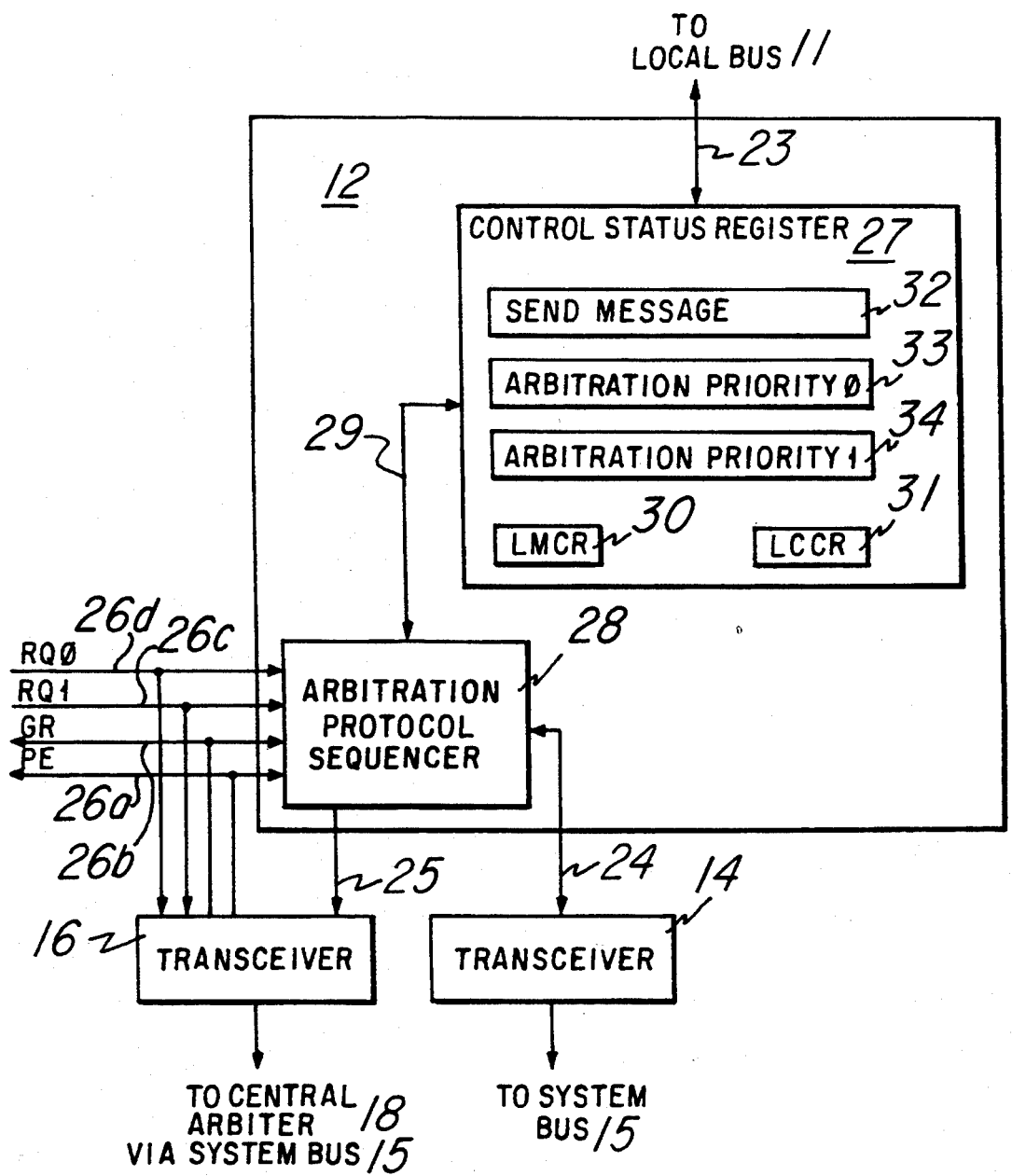
FIG. 2 is a logic diagram of the bus arbiter shown in FIG. 1.

The invention as shown in FIG. 2 contains the logic necessary to perform bus arbitration for systems operating in distributed mode or central mode with hardware and software that is mode independent.

FIG. 2 is a diagrammatic representation of a preferred embodiment of the Bus Arbiter 12 of FIG. 1. Control Status Register 27 is bidirectionally coupled to local bus 11 via Line 23. Arbitration Protocol Sequencer 28 is bidirectionally coupled to Register 27 via 29. Arbitration Protocol Sequencer 28 is also bidirectionally coupled to Protocol Control 13 and System Bus 15 via 26a–d.

Arbitration Protocol Sequencer 28 is also bidirectionally coupled to Transceiver 14 via 24 and Transceiver 16 via 25 and 26. Transceiver 16 is also bidirectionally coupled to Protocol Control 13 via 26.

Bus 24 is the main arbitration interface, performing the handshake between the Bus Arbiter 12 and System Bus 15. Bus 24 is used in both central and distributed mode to send messages to other bus agents, acquire the bus ownership in distributed mode, or in central mode to send priority updates to the central arbiter.

Line 23 provides register access, allowing the values in the registers of 27 to be loaded and observed. Within Control Status Register 27, Logical Module Control Register 30 indicates whether or not System Module 20 is master-enabled. This information is important when the system is operating in distributed mode. Logical Common Control Register 31 contains information indicating whether the system is operating in central mode or in distributed mode.

Send Message Register 32 contains the 8-bit arbitration message. When this register is written, an arbitration message is sent. Arbitration Priority Register 33 contains the 8-bit priority used when RQ0 (line 26d) is asserted. In distributed mode, this number is used to determine the arbitration number. In central mode, this number is used to automatically program the central arbiter via an arbitrated message. Arbitration Priority Register 34 contains the 8-bit priority used when RQ1 (line 26c) is asserted. In distributed mode, this number is used to determine the arbitration number. In central mode, this number is used to automatically program the Central Arbiter 18 via an arbitrated message. Control Status Register 27 also contains other registers necessary for configuration, control, status and test applicable to arbitration.

In summary, Control Status Register 27 contains the Control Status Registers (CSR's) necessary to make Bus Arbitration Circuit 12 operate mode independent.

Signal 26a (PE) is the preempt signal which is driven high to indicate that a module with a higher priority has become the master-elect when the system is in distributed mode. This signal remains in the high impedance state while the system is in the central mode. Signal 26b (GR) is the grant signal used by Bus Arbiter 12 when the system is in distributed mode to indicate that system bus mastership has been granted. This signal remains in the high impedance state when the system is in central mode. Signals 26a and 26b (RQ0 and RQ1 respectfully) are the signal lines used by Protocol Control 13 to request system bus access.

Bus Arbiter 12 contains other circuitry capable of other functions, such as a filter that filters out unwanted messages, which are not essential to the understanding of this invention; therefore, they are not shown.

Bus Arbiter Circuit 12 provides for the use of common run time software and uses a common hardware protocol for distributed mode and central mode operations. Line 23 and Control Status Register 27 provide the capability for software independence. Line 26 and Arbitration Protocol Sequencer 28 provide the capability for hardware independence.

Referring again to FIG. 1, a detailed functional description of the common hardware protocol feature of the invention is provided.

In general, arbitration is trying to get access to a shared resource. The purpose of an arbiter is to gain mastership of the system bus for a particular electronic board such as system module 20. The board which gains mastership is the board with the highest priority.

Priority registers 33 and 34 shown in FIG. 2 contain the priorities that are being used by system module 20 to compete for mastership. These priorities can be dynamically changed by the CPU 10 between bus requests.

In central mode there is a Central Arbiter 18 that takes all of the requests from all the modules (20 . . . n) and determines which system module gains mastership. Then the Central Arbiter 18 sends a grant signal over the System Bus 15 to the system module who was awarded mastership. Therefore, the arbiter 12 in each module 20 . . . n is not involved in the arbitration process when the system is operating in central mode. In central mode the Central Arbiter 18 has to know each individual priority for each system module (i.e. 20 and 21) in order to determine which system module gains mastership of the System Bus 15. The Central Arbiter 18 obtains these priorities via arbitrated messages sent over the arbitration bus by each bus arbiter circuit 12.

In distributed mode each arbiter 12 on each module 20 . . . n is operating and following a system bus protocol to determine which system module gains mastership of System Bus 15. In distributed mode arbitration each system module's Bus Arbiter 12 receives the request signal from the system module's Protocol Control 13; obtains the priority out of the appropriate priority register (33 or 34) and then competes for access to the System Bus 15. Each system module's priority can be changed by CPU 10 via Line 23 between each system bus request. Thus, Bus Arbiter 12 has dynamic priority updating capability.

In distributed mode and in central mode the software writes the priority in either priority register 33 or 34. It is transparent to the software that in distributed mode the new priority was used by Bus Arbiter 12 but in central mode the new priority was sent over the System Bus 15 and then loaded to the Central Arbiter 18 for use by the Central Arbiter. For this reason the Bus Arbiter is software independent: to the software the writing of the priorities is identical whether the system is in central mode or in distributed mode.

The advantage of the invention is that Bus Arbiter Circuit 12 can be operated in either central mode or distributed mode without having to modify the hardware to operate in either of the two modes. This is because the same signals (RQ0, RQ1, GR, and PE) are used by Bus Arbiter 12 to talk to the protocol control 13 in both modes. The central mode handshake is imitated by the Bus Arbiter circuit 12 when the system is operating in distributed mode. Therefore, it is transparent to Protocol Control 13 whether Bus Arbiter Circuit is performing in central mode arbitration or distributed mode arbitration.

In summary, the distributed mode provides the same handshake as required for central mode, as dictated by the system bus specification. Thus, hardware independence is realized because there is a single interface between the arbitration circuitry and the protocol device.

Protocol Control 13 in FIG. 1 is responsible for the transfer of information over the System Bus 15. Protocol Control 13 sends a request via line 26 to the Bus Arbiter to gain access to the System Bus 15. Arbiter Circuit 12 interfaces to the arbitration portion of the System Bus 15. Once Bus Arbiter 12 gains access to the System Bus 15, Bus Arbiter 12 issues a Grant signal over line 26 allowing Protocol Control 13 to perform the needed data transfer. Once the data transfer is complete Protocol Control 13 releases the request on line 26 and Bus Arbiter releases the Grant over Line 26 thereby allowing another device or module to access the System Bus 15.

Referring now to FIG. 2, a further detailed description of the hardware interfaces for operating the Bus Arbiter 12 in distributed mode and central mode is provided.

Control signal 25 and bus 26 facilitate hardware independence for Bus Arbiter 12. In central mode control signal 25 is activated. When control signal 25 is activated controller output enables 26a and 26b are deactivated, and the transceiver outputs 26a and 26b are activated. Thus, PE and GR, 26a and 26b, are serviced by the central arbiter.

In distributed mode control signal 25 is deactivated, causing controller output enables 26a and 26b to activate and transceiver output enables to deactivate. PE and GR are now serviced by the local Bus Arbiter 12. RQ0 and RQ1 are inputs from Protocol Control 13 identifying the device that requires mastership of the System Bus 15. These two inputs are sent to both the Transceiver 16 (who passes the signals on to the Central Arbiter 18) and to the Bus Arbiter 12.

An advantage of the invention is the software portability which is provided by mode independent operation. Since the run-time software is identical in distributed mode and central mode; the drivers can be ported from one system to another system. Thus, electronic board designers who are using Bus Arbiter Circuit 12 and who have already designed their driver software are able to plug their software into any system. This saves a lot of rewriting of codes which is one of the largest overheads in electronic board design.

Five registers are provided to facilitate software independence. These registers are message register 32, priority 0 register 33, priority 1 register 34, Logical Module control 30, and Logical Common Control 31.

Figure 3:
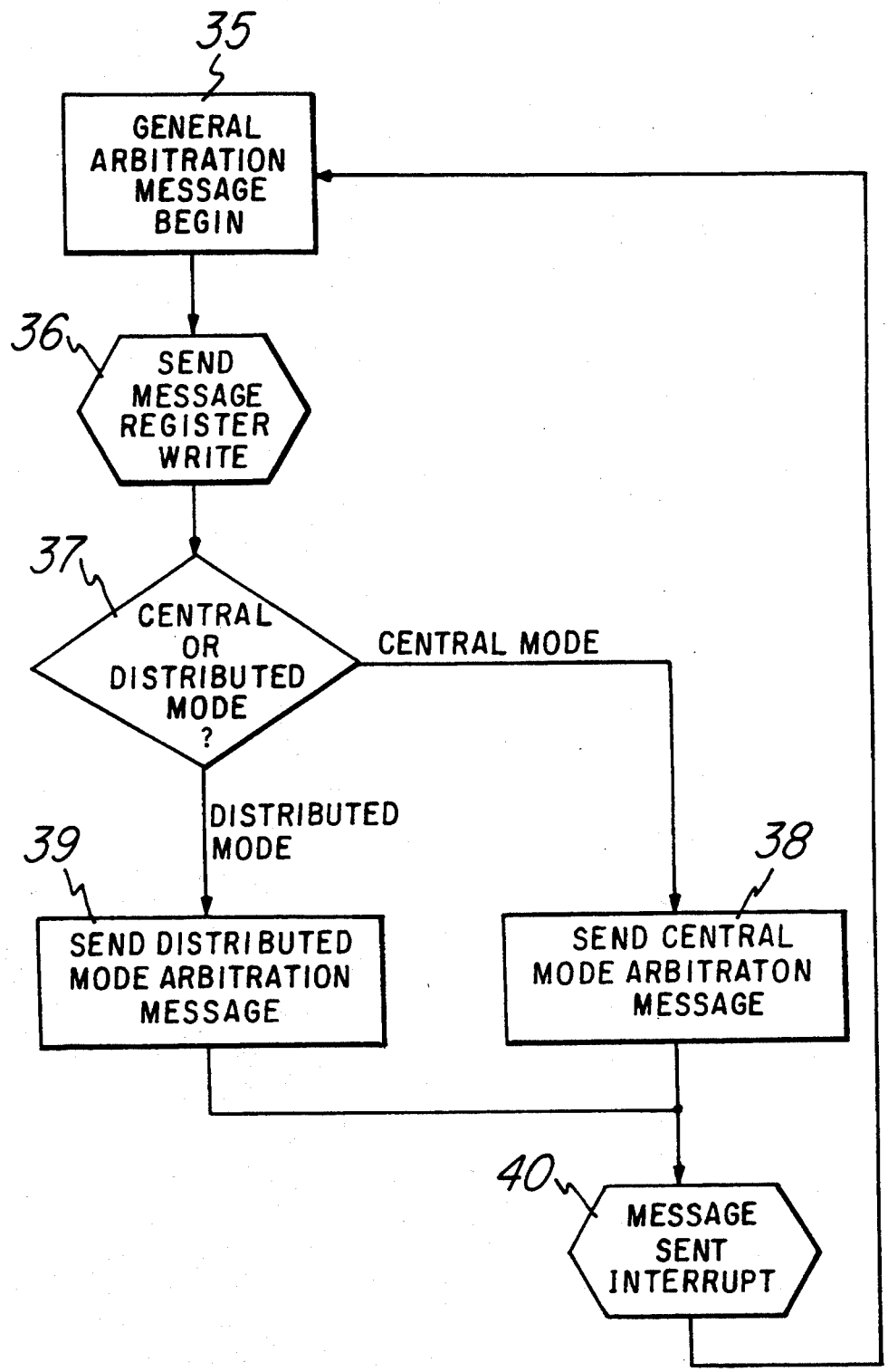
FIG. 3 is a flow chart depicting a set of steps which may be used by the bus arbiter of FIG. 2 for sending a general message in accordance with the present invention.
Figure 4:
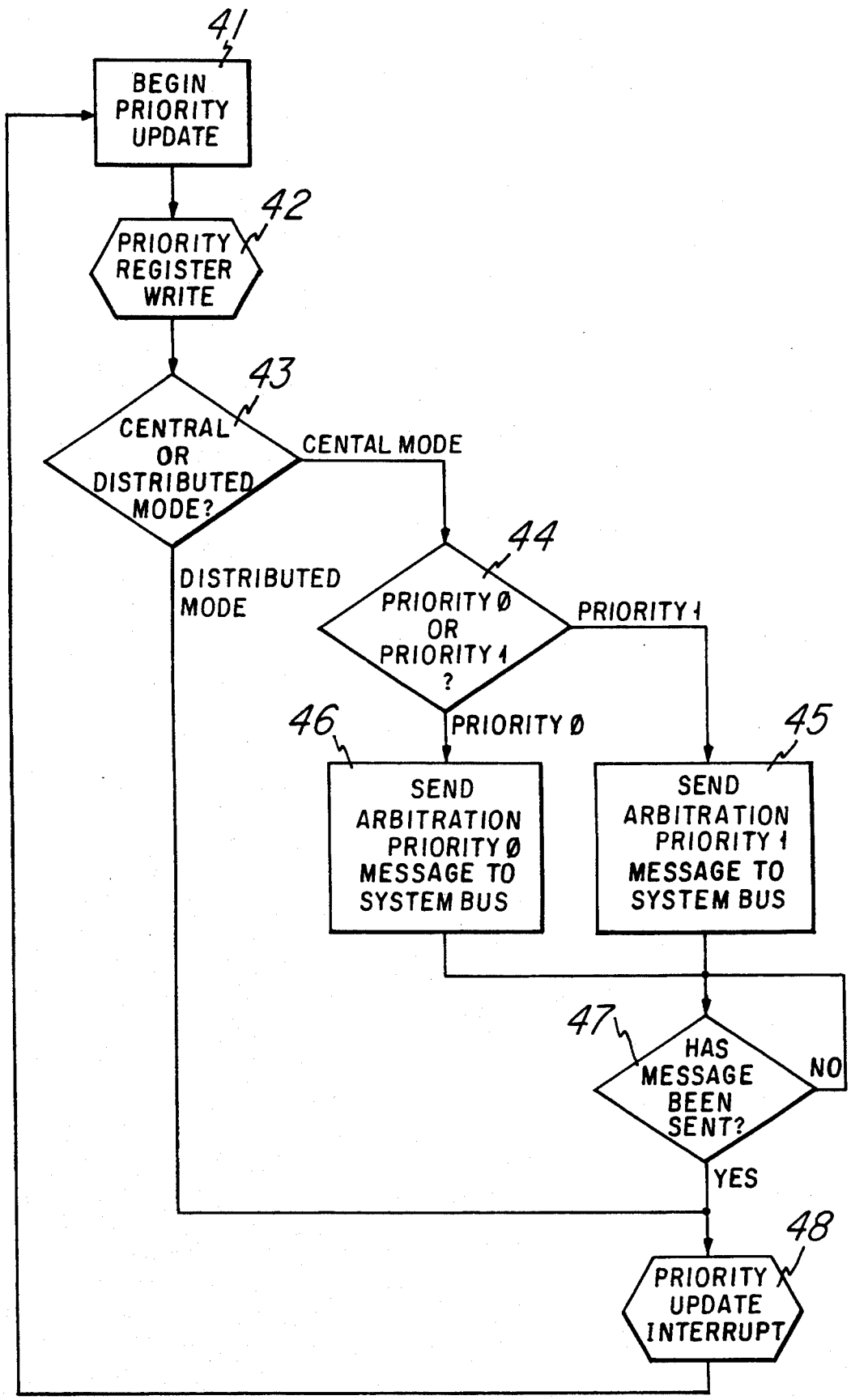
FIG. 4 is a flow chart depicting a set of steps which may be used by the bus arbiter of FIG. 2 for performing a priority update in accordance with the present invention.

FIG. 3 and 4 are flow diagrams illustrating the software independence capability of the invention. In both figures the steps written inside an octagon represent steps performed by the software executed by the module CPU 10.

FIG. 3 shows the functional steps followed by the invention when sending a general arbitration message. Software determines when general arbitration messages are sent. At Step 36 the software performs a write of the Send Message Register 32 this prompts the Bus Arbiter 12 to begin operation. At Step 37 the mode is checked by the Arbitration Protocol Sequencer 28. If the system is in central mode step 38 is to send a one byte arbitration message to the other modules in the system 19 ... n. If the system is in distributed mode, step 39 is to send a two byte arbitration message to the other modules in the system 19 ... n. Once the message is sent, the Bus Arbiter Circuit 12 issues an interrupt, Step 40, indicating that the arbitration message has been sent. The Bus Arbiter 12 is now ready to start again at Step 35 whenever software needs to send the next general arbitration message. As demonstrated by FIG. 3, the software interface points, Steps 36 and 40, are identical independent of the system mode; therefore, software independence is achieved.

FIG. 4 is also a flow diagram illustrating the software independence feature of the invention. FIG. 4 shows the functional steps followed by the invention when the task performed by software changes priority. The Bus Arbiter 12 performs a priority update when either Arbitration Priority 0 Register 33, or Arbitration Priority 1 Register 34, is written to via the local bus 11. At step 42 the software performs a write to either priority register 33 or 34. At Step 43 the Bus Arbiter 12 checks the mode by observing the central-arbiter bit in register 31. If the system is in distributed mode the Bus Arbiter Circuit 12 issues an interrupt at Step 48 to the CPU 10 informing the software that the priority has been updated.

If the system is in central mode Step 44 is determining which priority in the central arbiter circuit 18 needs to be updated. This decision is based upon which register (33 or 34) was written. If the Priority 1 register 34 was written then at Step 45 the Priority 1 update message is sent to the System Bus 15. If the Priority 0 register 33 was written then a Priority 0 update message is sent to the System Bus 15. At step 47 the Bus Arbiter 12 waits until the message has been sent to the Central Arbiter 18 over the System Bus 15. Once the message has been sent, the System Module 20 priorities are automatically updated in the Central Arbiter 18. At this point the Bus Arbiter Circuit 12 issues an interrupt at Step 48 to inform software that the priority has been updated. At this point the module is ready to perform a bus request at the new level. It is also ready to perform a new priority update starting at Step 41. The software interface points of writing to registers 33 or 34, Step 42, and issuing the interrupt, Step 48, are identical independent of the mode (distributed or central). Thus software independence is again achieved.

Figure 5:
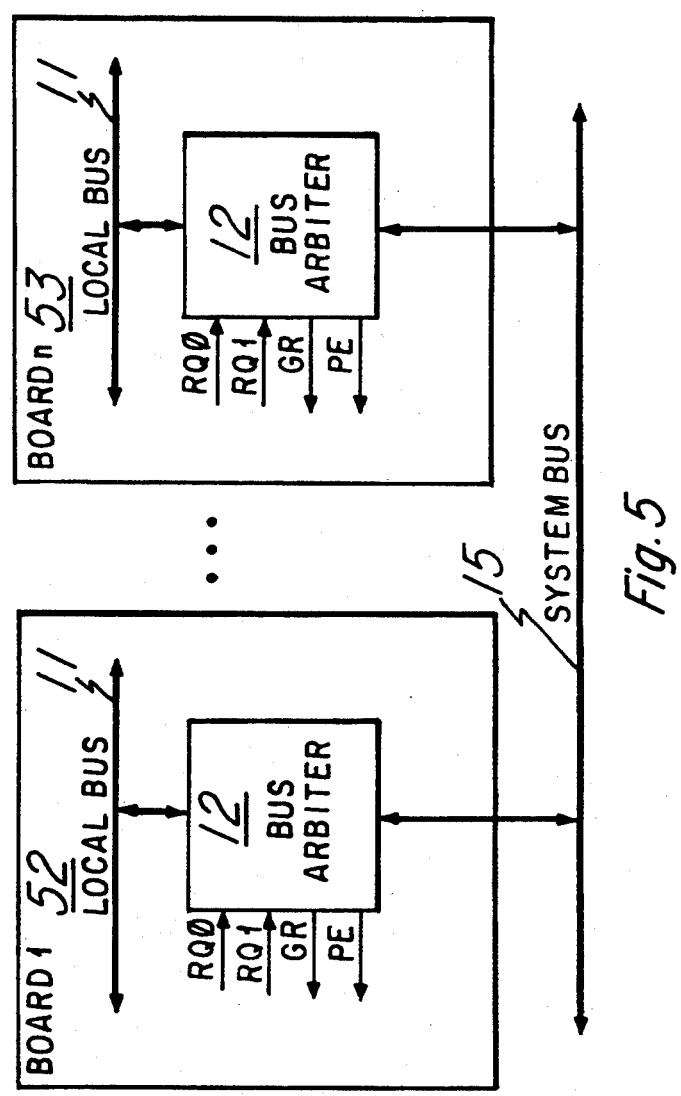
FIG. 5 is a block diagram showing a distributed mode only system configuration incorporating the invention.
Figure 6:
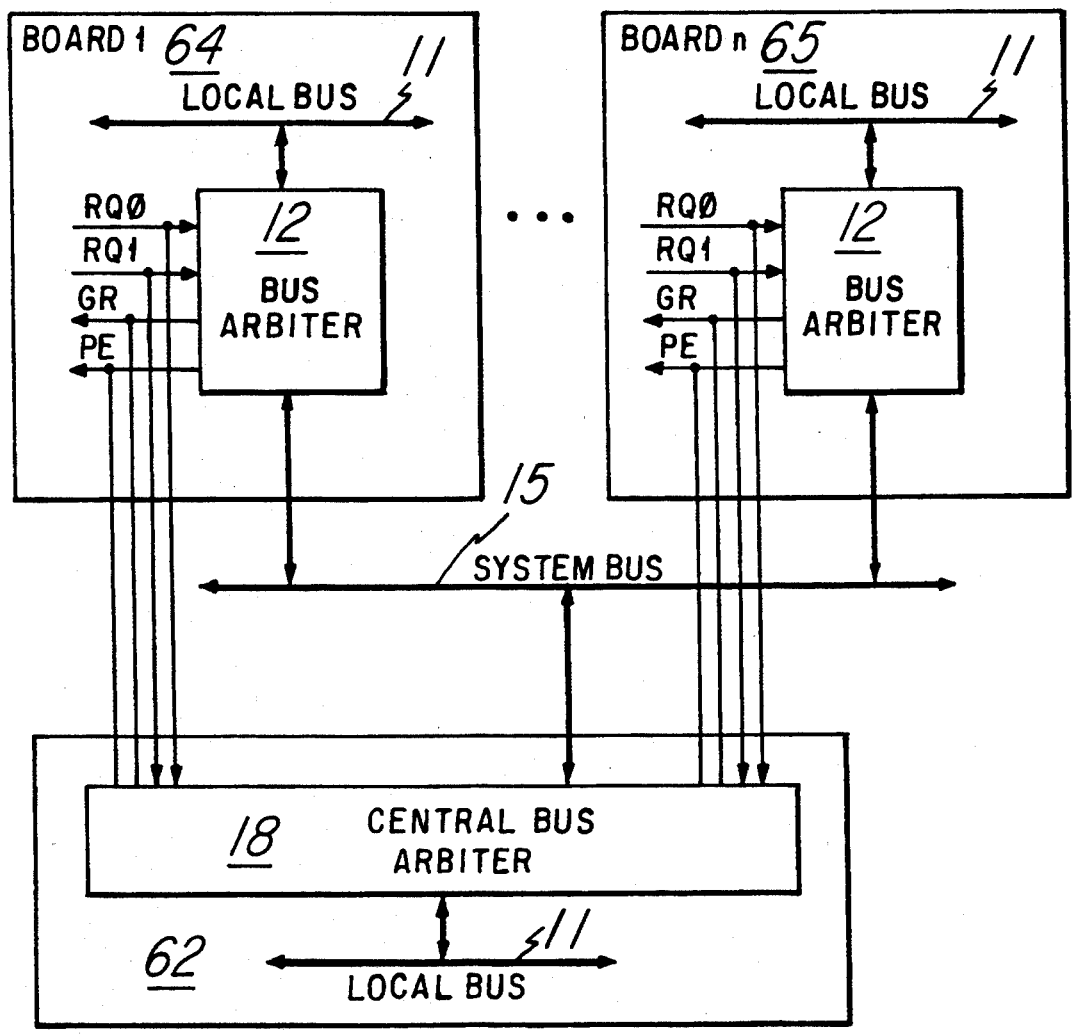
FIG. 6 is a block diagram showing a programmable central arbiter system configuration incorporating the invention.

Bus Arbiter 12 supports a wide variety of configurations. Two possible configurations are shown in FIGS. 5 and 6. Additionally, hybrids of these configurations may be devised by the system designer to meet specific design goals.

FIG. 5 shows a distributed mode only configuration. The arbitration speed of a distributed mode system is the slowest of the two configurations shown. In a distributed mode only configuration there are Bus Arbiters 12 on each module 52 ... n and they all hook up to the system bus. This configuration would be used in situations where the computer is used in distributed arbitration operation only; such as for a fault tolerant system. In this configuration each Bus Arbiter 12 is used in distributed mode and competes for the System Bus 15 on behalf of its system module 52 ... n.

FIG. 6 shows a programmable central arbiter system. There is a Central Arbiter 61 on one system module 62 and Bus Arbiters 12 on all of the other system modules 64 ... n which program the Central Arbiter 61. All of the request and grant lines come into the Central Arbiter 61. Fault tolerance is improved by providing distributed arbitration, a fully redundant scheme that is transparent to normal operation of the host module. System operation time is reduced while operating in central mode.

Still other configurations could be comprehended by persons skilled in the art. For instance a system could be designed with all central arbiters, which could program each other and decide which central arbiter was going to act as master. Additionally the central arbiter could be on more than one system module for redundancy, however only one would be active at any given time.

While in accordance with the provisions and statutes there has been illustrated and described the best mode of the invention, certain changes may be made without departing from the spirit of the invention as set forth in a appended claims. Various modifications of the disclosed embodiment will become apparent to persons skilled in the art upon reference to the description of the invention. It is therefore contemplated that the appended claims will cover any such modifications or embodiments as fall within the true scope of the invention.

What is claimed is:

1. A system comprising:
   a system bus;
   system modules coupled to said system bus including
      a processor;
      a local bus coupled to said processor;
      arbitration circuitry coupled to said local bus and said system bus, said arbitration circuitry including
         distributed mode operation circuitry which responds to a first signal allowing said arbitration circuitry to use distributed mode arbitration techniques to determine which system module gains access of said system bus,
         central mode operation circuitry which responds to a second signal allowing a central arbiter to use central mode arbitration techniques to determine which system module gains access to said system bus, and
   protocol control circuitry coupled to said arbitration circuitry, said system bus, and said local bus, for transferring information between said local bus and said system bus; said protocol control circuitry providing said first and second signal to said arbitration circuitry for selecting between distributed mode and said central mode operations.

2. The system of claim 1 wherein said arbitration circuitry further comprises:
common hardware interface circuitry for enabling software independence for distributed mode and central mode operations.

3. The system of claim 1 further comprising:
transceivers coupled to said arbitration circuitry and said protocol control circuitry for changing output signals from said arbitration circuitry to Backplane Transistor Logic (BTL) format used by said system bus and for allowing said arbitration circuitry output signals to be input onto said system bus.

4. The system of claim 1 wherein said arbitration circuitry comprises:
an arbitration protocol sequencer coupled to said protocol control circuitry; and
register circuitry coupled to said arbitration protocol sequencer and said local bus.

5. The system of claim 4 wherein the register circuitry comprises:
a register for making dynamic mode changes possible by indicating whether the system is operating in central or distributed modes.

6. The system of claim 4 wherein the register circuitry comprises:
a register for indicating whether or not said system module is master enabled.

7. The system of claim 4 wherein the register circuitry comprises:
at least one register for storing an arbitration message.

8. The system of claim 4 wherein the register circuitry comprises:
at least one register for dynamically storing a priority level.

9. The system of claim 4 wherein the register circuitry comprises:
at least one register for storing the configuration, control, status, and test information needed for system bus arbitration.

10. The system of claim 1 wherein said system bus is a Futurebus+.

11. An arbiter circuit, comprising:
an arbitration protocol sequencer for providing a common hardware protocol, between said arbiter circuit and any device desiring access to a system bus for distributed mode and central mode operation, said distributed mode operation using distributed mode arbitration techniques for allowing said arbiter circuit to determine which device gains access to said system bus, said central mode operation using central mode arbitration techniques for allowing a central arbiter to determine which device gains access to said system bus, said common hardware protocol provided by emulating a central mode arbitration sequence during distributed mode operation, and disabling itself and allowing a central mode arbiter to provide the central mode arbitration sequence during central mode operation; and
register circuitry coupled to said arbitration protocol sequencer having common hardware interface circuitry for enabling software independence for distributed mode and central mode operations; wherein the mode of operation is determined by examining a bit in said register circuitry.

12. The circuit of claim 11 wherein said arbiter circuit performs central arbitration functions including; receiving bus mastership requests from all system modules requiring bus mastership; and granting bus mastership to any one of said system modules.

13. The circuit of claim 12 further including receiving priority updates from a system bus.

14. The arbiter circuit of claim 11 wherein said arbiter circuit is capable of dymanically switching from servicing a system module in central mode to servicing said system module in distributed mode.

15. The arbiter circuit of claim 11 wherein said arbiter circuit is capable of switching from servicing a system module in distributed mode to servicing said system module in central mode.

16. A method of communication between arbitration circuitry and its system module to utilize the arbitration process to determine which system module gains access to a system bus comprising the steps of:
receiving service requests from said system module;
determining whether the system is operating in distributed mode or central mode;
sending a distributed mode arbitration message to said system module if the system is operating in distributed mode;
sending a central mode arbitration message to said system module if the system is operating in central mode; and
sending an indication to said system module that said operation is completed;
wherein common hardware protocol is used for said central mode and distributed mode operations.

17. The method of claim 16 wherein said method is used to gain mastership of a system bus.

18. The method of claim 16 wherein said method is used to send messages.

19. The method of claim 16 wherein said method is used to update a priority.

20. A method of communication between arbitration circuitry and its system module to utilize the arbitration process to determine which system module gains access to a system bus comprising the steps of:
receiving service requests from a system module;
determining whether the system is operating in central mode or distributed mode;
sending a distributed mode arbitration message to said system module if the system is operating in distributed mode;
sending a central mode arbitration message to said system module if the system is operating in central mode; and
sending an indication to said system module that said operation is completed;
wherein common hardware interface circuitry enables software independence for distributed mode and central mode operations.

21. The method of claim 20 wherein said receiving and determining steps are used to gain mastership of a system bus.

22. The method of claim 20 wherein said receiving and determining steps are used to send messages.

23. The method of claim 20 wherein said method is used to update a priority.

24. A method of receiving arbitrated messages comprising the steps of:
monitoring a system bus;
determining mode of the system operation by examining the status of a bit located in a register;
receiving and storing said arbitrated messages; and
sending an indication to a system module that said arbitrated message has been received;

said distributed mode operation using distributed mode operation techniques for allowing an arbiter circuit on each system module to determine which system module gains access to said system bus;

said central mode operation using central mode arbitration techniques for allowing a central arbiter to determine which system module gains access to said system bus;

wherein said determining, receiving, and sending steps are performed when the hardware interface circuitry is operating in both the distributed mode and central mode, and therefore, software independence is achieved.

25. A method of performing a priority update in an arbiter circuit when a system is operating in central mode and distributed mode comprising the steps of:

writing a priority value to a priority register;

determining whether said system is operating in distributed or central mode by examining the status of a bit located in a register;

issuing an interrupt signal to a local bus if said system is operating in distributed mode signifying that the priority is updated;

determining which priority is to be updated if said system is operating in central mode;

sending a priority update message appropriate for said determined priority if in central mode;

monitoring whether said message has been sent over a system bus; and issuing an interrupt if said message has been sent and if said system is operating in central mode.

26. The method of claim 25 wherein common hardware protocol is used for distributed mode and central mode operations.

27. The method of claim 25 wherein common hardware interface circuitry enables software independence for distributed mode and central mode.

28. A method of sending a general arbitration message to a module of a system from an arbiter circuit operating in distributed mode and central mode comprising the steps of:

writing said general arbitration message to a message register;

determining whether said system is operating in central mode or distributed mode;

sending a central mode arbitration message or distributed mode arbitration message to said module from said arbiter circuit in response to said determination; and issuing an interrupt signal to a local bus indicating that one of said mode arbitration messages has been sent.

29. The method of claim 28 wherein common hardware protocol is used for distributed mode and central mode operations.

30. The method of claim 28 wherein common hardware interface circuitry enables software independence for distributed mode and central mode.

* * * * *